(12) United States Patent
Boucher (10) Patent No.: US 7,793,150 B1
(45) Date of Patent: Sep. 7, 2010

(54) SYSTEM, METHOD, AND COMPUTER PROGRAM PRODUCT FOR SAVING AN UNPROCESSED PORTION OF A PUSH BUFFER IN RESPONSE TO AN ERROR

(75) Inventor: Eric Michel Boucher, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 11/873,198

(22) Filed: Oct. 16, 2007

(51) Int. Cl.
*G06F 11/00* (2006.01)

(52) U.S. Cl. ........................................ 714/16

(58) Field of Classification Search ................. None
See application file for complete search history.

(56) References Cited

U.S. PATENT DOCUMENTS

2008/0141131 A1* 6/2008 Cerny et al. ................. 715/716

* cited by examiner

*Primary Examiner*—Michael C Maskulinski
(74) *Attorney, Agent, or Firm*—Zilka-Kotab, PC (57) ABSTRACT

A system, method, and computer program product are provided for saving an unprocessed portion of as push buffer in response to an error. In use, operation of hardware is controlled utilizing a push buffer. Furthermore, an error is detected. In response to the error, an unprocessed portion of the push buffer is saved, at least in part.

25 Claims, 6 Drawing Sheets

SYSTEM, METHOD, AND COMPUTER PROGRAM PRODUCT FOR SAVING AN UNPROCESSED PORTION OF A PUSH BUFFER IN RESPONSE TO AN ERROR

FIELD OF THE INVENTION

The present invention relates to push buffers, and more particularly to managing errors when controlling hardware using a push buffer.

BACKGROUND

A push buffer is typically used by a driver for controlling hardware (e.g. a graphics processor). In use, the push buffer is written with instructions and/or data which may in turn, be read by the hardware. Software maintains a put pointer, which describes the last offset in the push buffer, where data has been inserted. The hardware maintains a get pointer, which describes the offset in the push buffer that the hardware is currently processing. When an error results from a faulty instruction/data or hardware error, the push buffer is typically cleared and re-initialized.

Unfortunately, this results in a significant visual manifestation, Such visual manifestation may range from an unsightly glitch to a blank screen, etc. There is thus a need for addressing this and/or other issues associated with the prior art.

SUMMARY

A system, method, and computer program product are provided for saving an unprocessed portion of a push buffer in response to an error. In use, operation of hardware is controlled utilizing a push buffer. Furthermore, an error is detected. In response to the error, an unprocessed portion of the push buffer is saved, at least in part.

DETAILED DESCRIPTION

Figure 1:
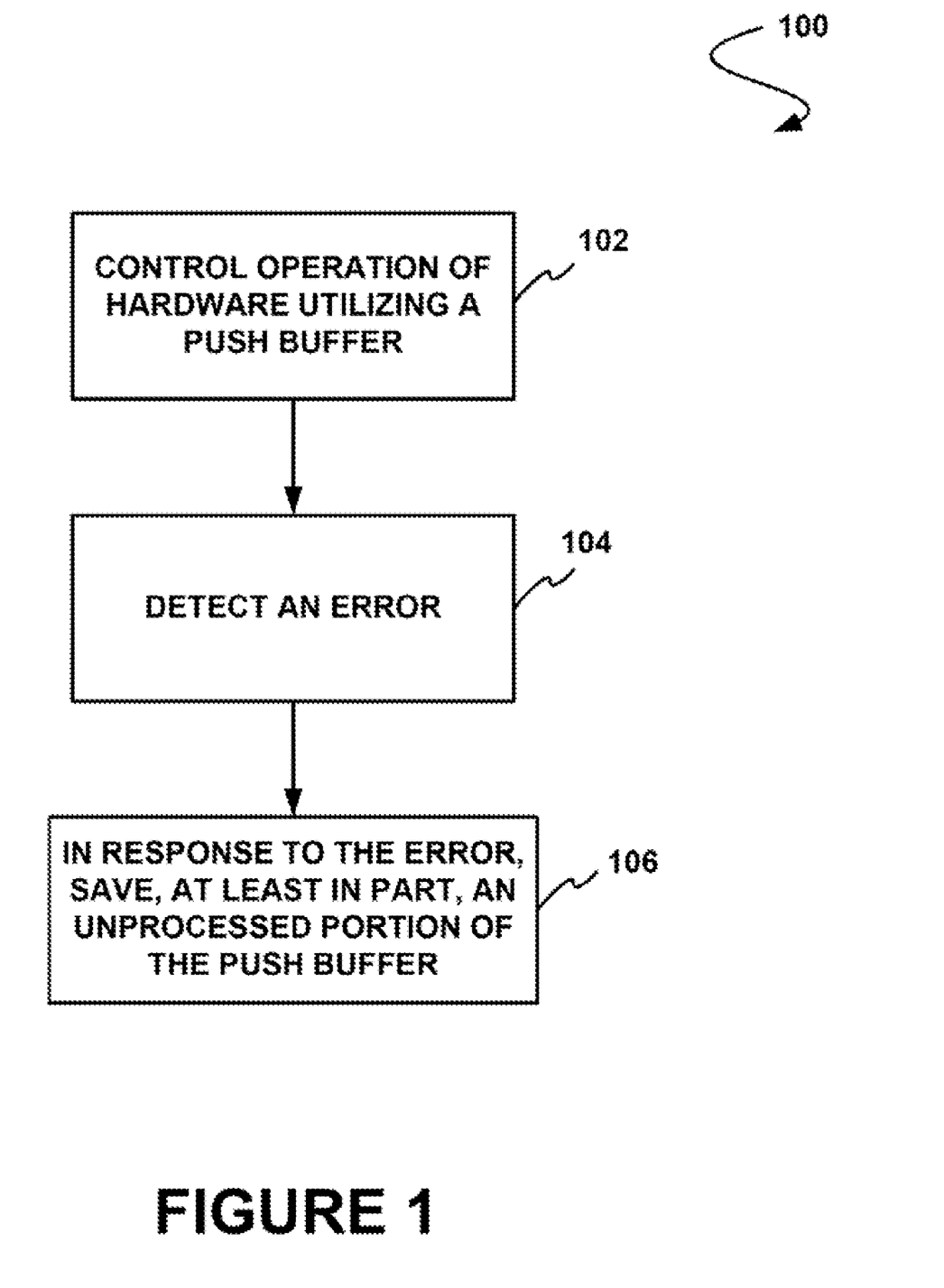
FIG. 1 shows a method for saving an unprocessed portion of a push buffer in response to an error, in accordance with one embodiment.

FIG. 1 shows a method 100 for saving an unprocessed portion of a push buffer in response to an error, in accordance with one embodiment. As shown, operation of hardware is controlled utilizing a push buffer. See operation 102.

In the context of the present description, a push buffer refers to a memory buffer in which data may be stored. In one embodiment, the push buffer may be controlled by a driver or software. As an option, data flow to and from the push buffer may be managed using put and get pointer, respectively.

Furthermore, in the context of the present description, hardware may refer to any hardware capable of being controlled by a push buffer. For example, in various embodiments, the hardware may include, but is not limited to a central processor, a graphics processor, a microprocessor, a digital signal processor, and/or any other hardware that meets the above definition. In one embodiment, the hardware may include a central processing unit (CPU) and/or a graphics processor in the form of a graphics processing unit (CPU).

As shown further, an error is detected. See operation 104. The error may be any type of error, such as a hardware or software error (e.g. a driver error). In various embodiments, the error may be detected from an operating system event, from a driver, and/or from the hardware. Additionally, the error may be detected while waiting for push buffer space (i.e. waiting for available write space), and while waiting for a completion notifier (e.g. a notification that an operation of the hardware is complete).

Furthermore, in response to the error, an unprocessed portion of the push buffer is saved, at least in part. See operation 106. In the context of the present description, the unprocessed portion of the push buffer may be any data in the push buffer that has not been processed.

In one embodiment, the unprocessed portion of the push buffer may be used for restoring operation of the hardware. For example, upon encountering an error, the operation of hardware may have been halted or interrupted. In this case, the unprocessed portion of the push buffer may then be used for restoring operation of the hardware.

Strictly as an option the operation of the hardware may be restored by restoring a state of the hardware. Additionally, in one embodiment, the control of the hardware, the detection of the error, and/or the saving of the unprocessed push buffer portion may be performed by a driver. In the context of the present description, a driver may refer to any computer program or software that interacts or allows interaction with the hardware.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
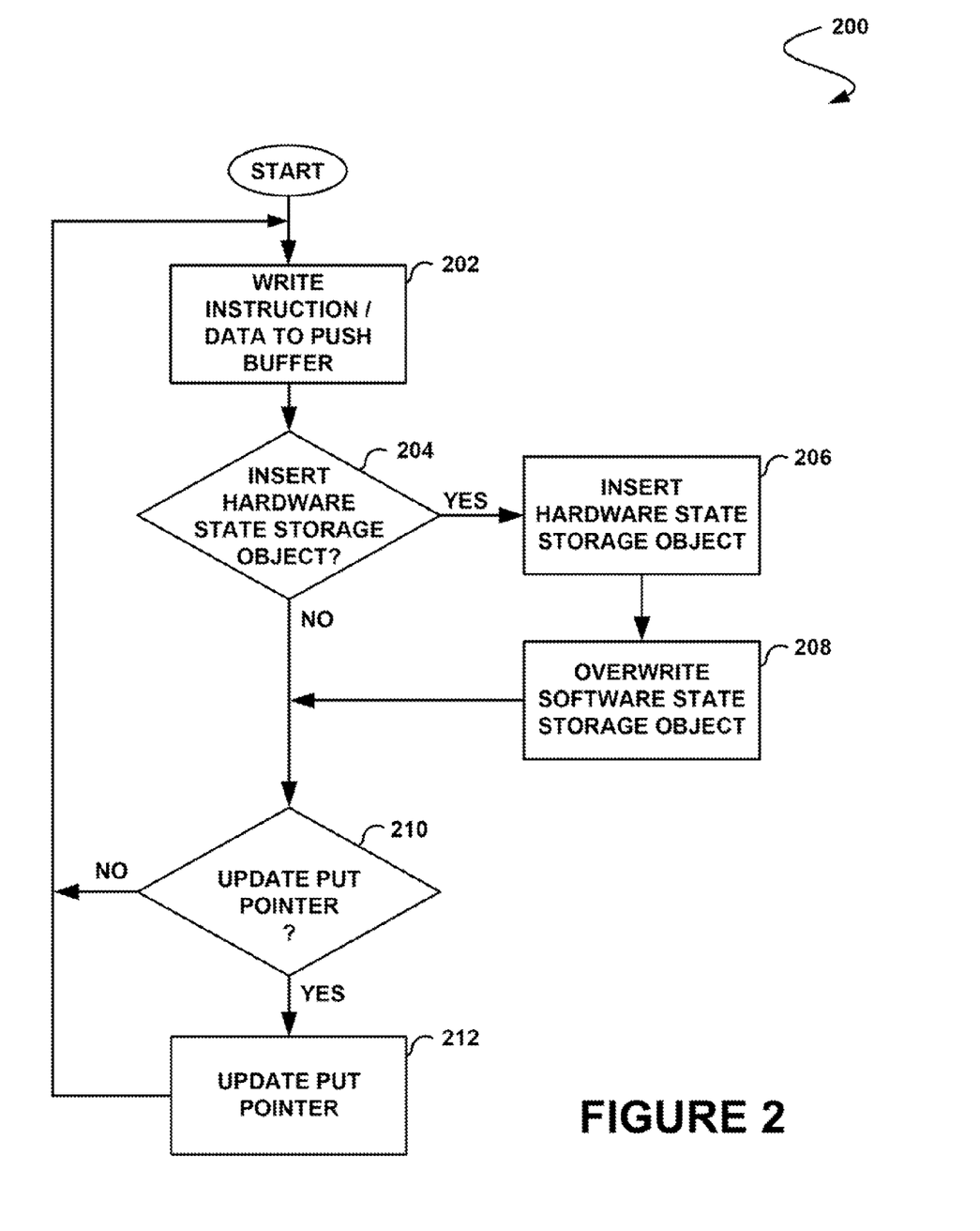
FIG. 2 shows a method for inserting instructions and hardware state storage objects into a push buffer, in accordance with one embodiment.

FIG. 2 shows a method 200 for inserting instructions and hardware state storage objects into a push buffer, in accordance with one embodiment. As an option, the present method 200 may be implemented in the context of the functionality of FIG. 1. Of course, however, the method 200 may be carried out in any desired environment. It should also be noted that the aforementioned definitions may apply during the present description.

As shown, an instruction or data is written to a push buffer. See operation 202. In the context of the present description, the instruction or data may be any instruction or data capable of being utilized by hardware. For example, in various embodiments, the instruction or data may include, but is not limited to central processor instructions, graphics processor instructions (e.g. object draw instructions, cursor change instructions, etc.), and/or any instruction or data that meets the above definition.

In one embodiment, a driver may write the instruction or data to the push buffer. For example, the driver may update a pointer in conjunction with writing the instruction or data to the push buffer. As an option, the pointer may indicate the end of the instruction or a set of instructions in the push buffer (e.g. a put pointer). In this case, the pointer may indicate the last point of data or instructions in the push buffer that is ready for hardware processing.

Once the instruction or data is written to the push buffer, it is determined whether to insert a hardware state storage object. See operation 204. In the context of the present description, a hardware state storage object refers to any object that indicates a current state of the hardware.

For example, in various embodiments, the hardware state storage object may include a current color format being used, a current setup of a graphics engine (e.g. a render operation setup, a rotate operation setup, etc.), and/or any information indicating the current state of the hardware. In one embodiment, the hardware state storage object may include a fixed data structure. In this case, current hardware state information of the hardware may be used to populate the fixed data structure.

In one embodiment the hardware state storage object may include a marker. The marker may be used to indicate a position of the hardware state storage object in the push buffer, for example. In one embodiment, the marker may be used to indicate a section of instructions. For example, the marker may indicate sections of related instructions (e.g. a series of instructions to complete to common task or function).

Furthermore, the determination of whether to insert the hardware state storage object may be based on different criteria. In one embodiment, the determination on whether to insert the hardware state storage object may be based on the instruction or data that is written to the push buffer. For example, it may be determined to insert the hardware state storage object after every instruction, set of instructions, or data that is written to the buffer. In one embodiment, the hardware state storage object may divide the push buffer into sections of instructions.

In one embodiment, the determination may be based on a length of the instruction, the set of instructions, or the data. As an option, the determination may be based on a pointer. For example, it may be determined to insert the hardware state storage object every time a put pointer is updated associated with the push buffer. In this case, the hardware state storage object may include the latest hardware state of the hardware when the put pointer was updated.

If it is determined to insert a hardware state storage object, the hardware state storage object is inserted. See operation 206. Once the hardware state storage object is inserted, a software state storage object is overwritten or saved. See operation 208.

In the context of the present description, the software state storage object refers to an object which indicates a current state of software or a driver. For example, in various embodiments, the software state storage object may include a current color format being used by the hardware, a current setup of a graphics engine (e.g. a render operation setup, a rotate operation setup, etc.), and/or any other information indicating the current state of the software or a driver. In one embodiment, the software state storage object may be stored in memory separate from the push buffer.

After the software state storage object has been overwritten, or if it is determined not to insert a hardware state storage object, it is determined whether to update a put pointer. See operation 210. If it is determined to update a put pointer, the put pointer is updated with a new offset in the push buffer. See operation 212.

If it is determined not to update a put pointer, another instruction or more data is written to the push buffer. See operation 202. It should be noted that the update of the put pointer with a new offset in the push buffer may initiate a read of the push buffer by hardware.

Figure 3A:
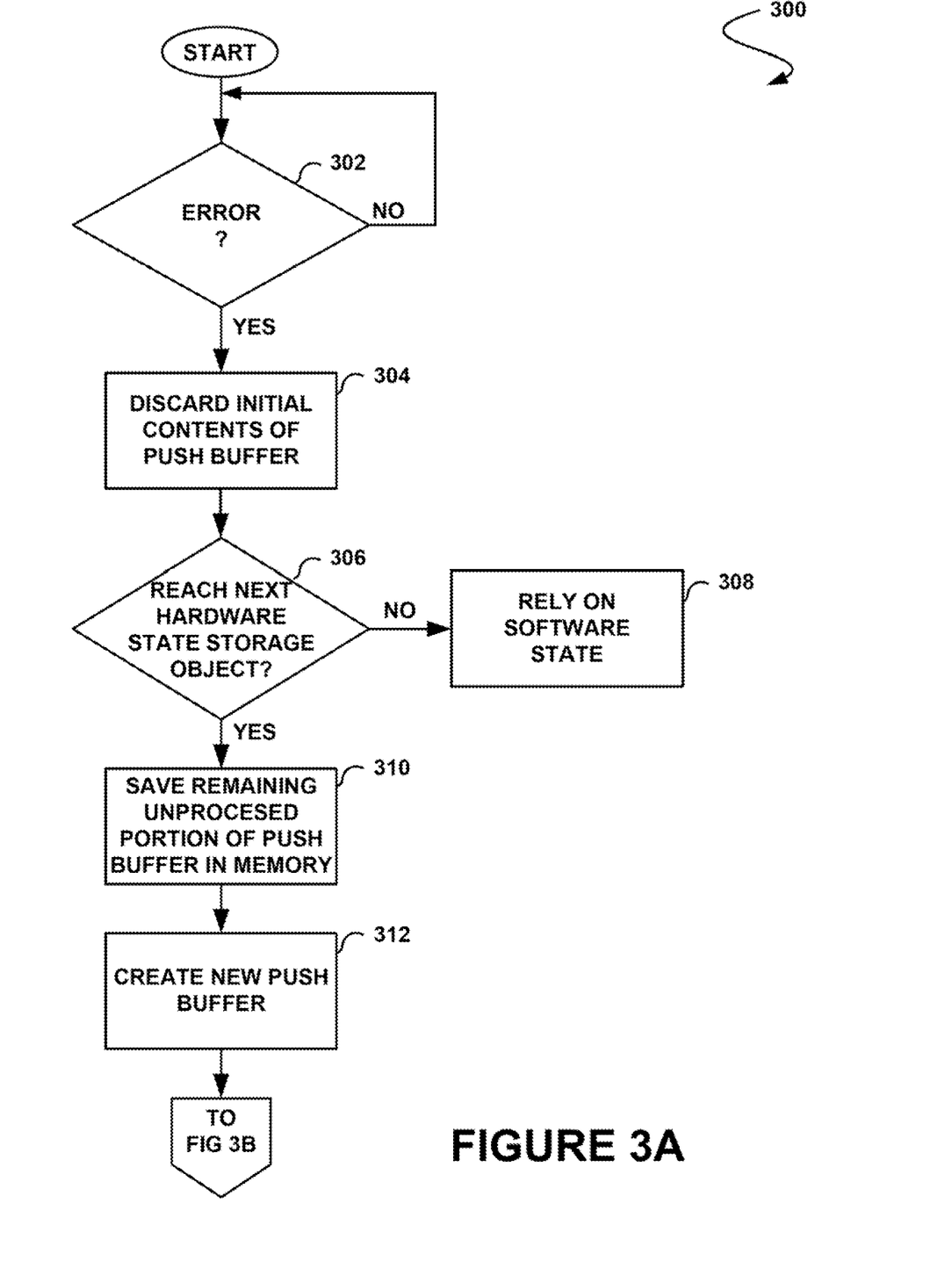
FIGS. 3A and 3B show a method for saving an unprocessed portion of a push buffer in response to an error, in accordance with another embodiment.
Figure 3B:
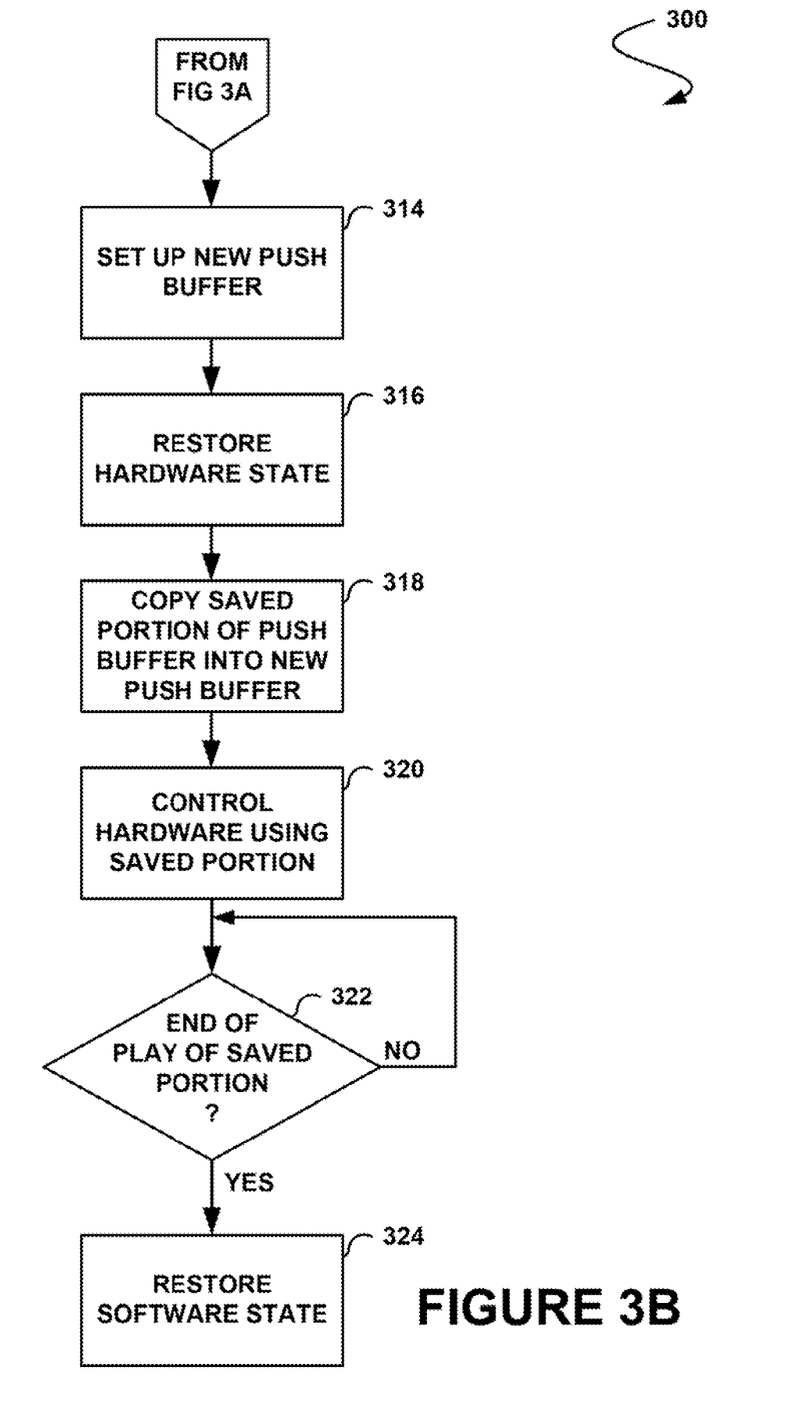

FIGS. 3A and 3B show a method 300 for saving an unprocessed portion of a push buffer in response to an error, in accordance with another embodiment. As an option, the present method 300 may be implemented in the context of the functionality of FIGS. 1-2. Of course, however, the method 300 may be carried out in any desired environment. It should also be noted that the aforementioned definitions may apply during the present description.

As shown, it is determined whether an error has occurred. See operation 302. The error may be a hardware or software error. In one embodiment, the error may be an error resulting front an erroneous instruction or invalid data stored in a push buffer. In another embodiment, the error may be an error resulting from a fault in the hardware. As an option, the hardware may report the error.

If it is determined that an error has occurred, initial contents of a push buffer are discarded. See operation 304. In the context of the present description, the initial contents may be any instruction or data in the push buffer which have not been processed and is between an error point and a subsequent hardware state storage object. For example, an error may occur in the middle of an instruction set. In this case, the instructions between the error and a subsequent hardware state storage object may be discarded.

After the initial contents of the push buffer are discarded, it is determined whether a next hardware state storage object is reached. See operation 306. If the next hardware state storage object has not been reached, a software state is relied on for a state determination. See operation 308. In use, such next hardware state storage object may not necessarily be reached in a situation where an error occurs after a final hardware state storage object in the push buffer.

In one embodiment, the software state may be an initial state of a driver. In another embodiment, the software state may be a last known state of the driver. As an option, the software state may be included in a software state storage object. In this case, the software state storage object may be stored in memory.

If the next hardware state storage object has been reached, the remaining unprocessed portion of the push buffer is saved into memory. See operation 310. For example, if the buffer contains instructions or data which has not been processed, the instructions or data may be saved into memory.

In one embodiment, the remaining unprocessed portion of the push buffer may be a portion between a pointer indicating a position of data which was last read (e.g. a GET pointer) or a point where the error occurred, and a pointer indicating a position of a last instruction or data in the push buffer (e.g. a put pointer). For example, if the error occurred between a first and a second hardware state storage object, the unprocessed data in the push buffer may be saved beginning at the second hardware state storage object up to a location of a latest put pointer. In this case, the instructions or data between the error and the second hardware state storage object would be discarded.

Once the unprocessed portion of the pushed buffer is saved to memory, a new push buffer is created. See operation 312. After the new push buffer is created, the new push buffer is set up, or initialized. See operation 314.

In the context of the present description, setting up or initializing the new push buffer may involve freeing the new push buffer and all associated objects. For example, setting up or initializing the new push buffer may involve clearing a handle of the new push buffer and clearing all child objects associated with the new push buffer. After clearing the new push buffer and associated objects, the new push buffer and associated objects may be reallocated and reinitialized. This may involve reallocating and reinitializing any digital to analog converter (DAC) objects, cursor classes, 2D and 3D objects, an XFree86 Acceleration Architecture (XAA) layer, the new push buffer, and/or any other objects that may be reallocated and reinitialized.

Once the new push buffer is set up, a hardware state is restored. See operation 316. In one embodiment, the hardware state may be restored using information included in a hardware state storage object. For example, the hardware state storage object may include a current color format being used by hardware, a current setup of a graphics engine (e.g. a render operation setup, a rotate operation setup, etc.), and/or any information indicating the current state of the hardware.

In one embodiment, information included in the hardware state storage object may be translated into instructions or data which may be written to the new push buffer. As an option, a driver may translate the information which is included in the hardware state storage object into instructions or data. In one embodiment, the hardware state storage object may be a fixed data structure. In this case, translating the information included in the hardware state storage object may include populating a set of instructions using the information in the fixed data structure.

Once the hardware state is restored, the saved portion of the push buffer is copied into the new push buffer. See operation 318. The hardware is then controlled using the saved portion in the new push buffer. See operation 320. For example, instructions or data may be read from the new push buffer in order to control the hardware.

It is then determined whether the end of the saved portion in the new push buffer has been reached. See operation 322. Once the end of the saved portion has been reached, a software state is restored. See operation 324. In one embodiment, restoring the software state may involve restoring a driver to an initial state. In another embodiment, restoring the software state may involve restoring the driver to a last know state.

It should be noted that restoring the software state may allow for additional instructions or data to be written to the new push buffer. Additionally, the push buffer which initially encountered the error may be cleared in parallel with operating the hardware using the new push buffer. In a situation where an error occurs in conjunction with use of the new push buffer, the method 300 may be repeated accordingly.

Figure 4:
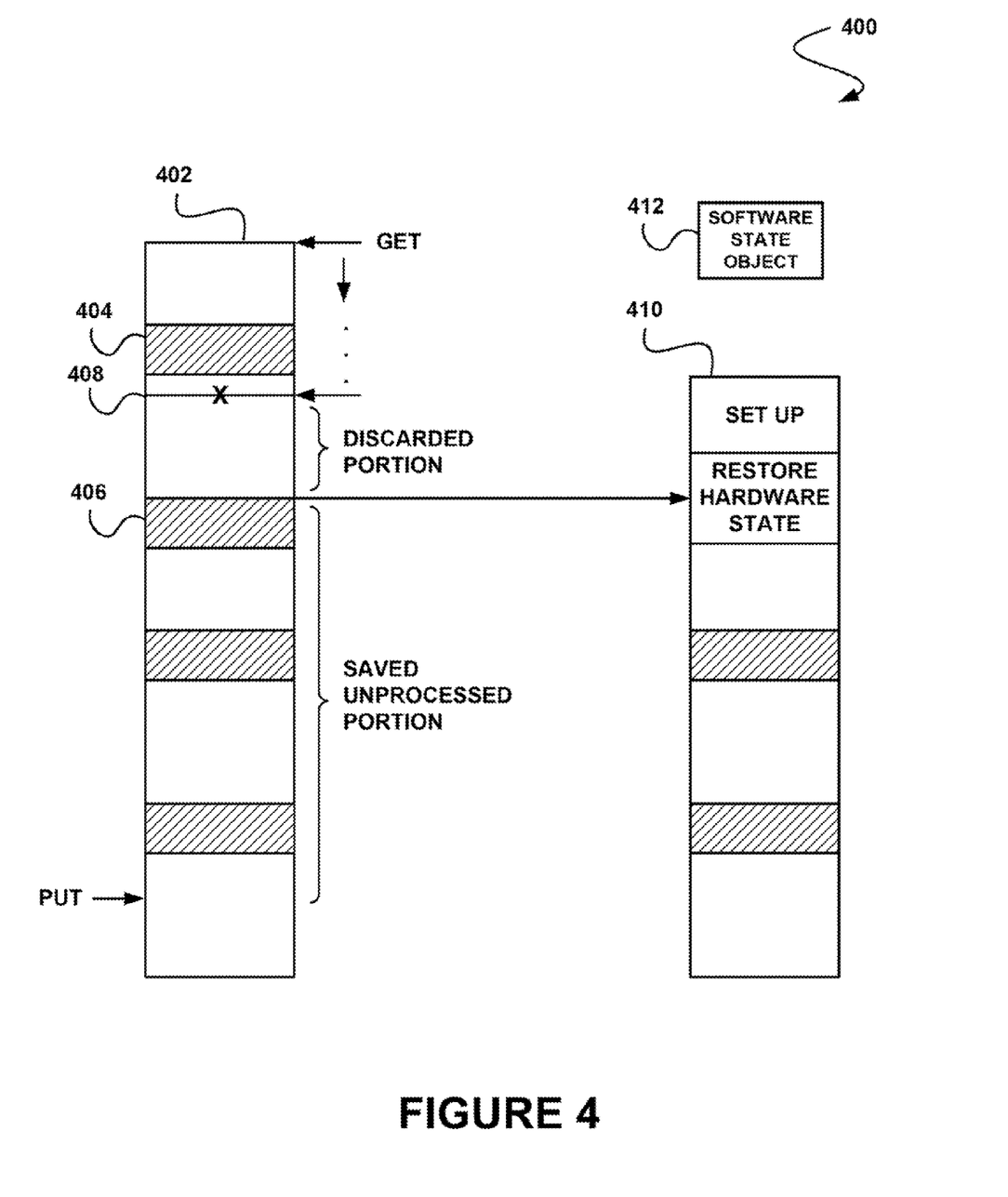
FIG. 4 shows a system for saving an unprocessed portion of a push buffer in response to an error, in accordance with one embodiment.

FIG. 4 shows a system 400 for saving an unprocessed portion of a push buffer in response to an error, in accordance with one embodiment. As an option, the present system 400 may be implemented in the context of the methods of FIGS. 1-3. Of course, however, the system 400 may be implemented in any desired environment. Again, the aforementioned definitions may apply during the present description.

As shown, a push buffer 402 is provided. Additionally, a plurality of hardware state storage objects 404, 406 are included with the push buffer 402. In operation, instructions and/or data are written to the push buffer 402.

In the context of the present description, instructions refer to any control information which may be used by, or communicated to hardware. In one embodiment, writing the instructions and/or data may further include updating a put pointer describing an offset in the push buffer 402. In such case, the put pointer may indicate the end of an instruction or a particular set of instructions, and/or any associated data.

Once the instructions and/or data are written, the instructions and/or data may be read from the push buffer 402 in order to control hardware. In one embodiment, a pointer may indicate the instructions and/or data being read from the push buffer 402. For example, a get pointer may point to the instructions and/or data being read from the push buffer 402.

As the instructions and/or data are being read from the push buffer 402, the get pointer may increment from the beginning of the push buffer 402 until the get pointer reaches the put pointer. Once the get pointer reaches the put pointer, the instructions and/or data have been processed up to the put pointer. In the case where an error occurs during the reading process between a first hardware state storage object 404 and a second hardware state storage object 406, at a point 408 in the push buffer 402, the unprocessed instructions and/or data between the point 408 and the second hardware state storage object 406 are discarded.

It should be noted that, in operation, a driver may regularly write the hardware state storage objects 404, 406, which represent the current hardware state of the hardware, to the push butler 402. See FIG. 2, for example. The current hardware state may indicate setup or configuration information for 2D and 3D functions, for example. In one embodiment, the hardware state storage objects may be written with a non incremental no-operation method.

It should also be noted that, when an error occurs, the driver may still read the instructions in the push buffer 402 and a position of a get pointer. This information may be used to find a push buffer section that has not been processed (e.g. after the second hardware state storage object 406). The remaining unprocessed instructions in the push buffer 402 are then saved into memory.

In addition to saving the unprocessed portion of the push buffer 402 into memory, a software state is saved into a software state object 412. The software state object 412 may include any information regarding the current state of a driver or software. Such information may include information regarding the driver configuration relating to the hardware, for example. In one embodiment, a software state may be saved every time a put pointer is written to the push buffer 402.

After the occurrence of the error, a new push buffer 410 is created. The new push buffer 410 is then set up or initialized. After the set up of the new push buffer 410, a hardware state is restored. The hardware state may be restored using information stored in the second hardware state storage object 406. For example, the hardware state storage object 406 may include hardware state information to restore the hardware to a state such that the hardware may execute the saved unprocessed instructions.

In one embodiment, the state information included in the hardware state storage object 406 may be translated into instructions and/or data which are written to the new push buffer 410. In another embodiment, the state information included in the hardware state storage object 406 may include instructions and/or data which are written to the new push buffer 410. In addition to restoring the hardware state, the software state is restored.

In one embodiment, restoring the software state may include reading the software state from the push buffer 402. In another embodiment, restoring the software state may include using information stored in the software state object 412. Once the hardware and software states are restored, the saved unprocessed instructions are written to the new push buffer 410.

After the saved unprocessed, instructions are written to the new push buffer 410, the unprocessed instructions may be read from the new push buffer 410 in order to control the hardware. It should be noted that, by saving; the unprocessed portion of data from the push buffer 402; and subsequently using the unprocessed portion to control the hardware via the new push buffer 410, a majority of data originally written to the push buffer 402 may be utilized. Thus, upon occurrence of an error, data may be preserved as opposed to discarding much or all of the remaining unprocessed data. In one embodiment, the operation of the hardware may be restored without perceptible visual ramifications resulting from the error.

For example, if the hardware being controlled by the push buffer 402 is a GPU, the instructions written to the push buffer 402 may include any graphics process to be performed or processed by the GPU. If an error occurs as the instructions and/or data are being read from the push buffer 402, the unprocessed instructions and/or data in the push buffer 402 may be saved.

The new push buffer 410 is initialized and then used to restore the GPU to a known hardware state. The saved unprocessed instructions and/or data are subsequently copied to the new push buffer 410. The GPU is then controlled using the saved unprocessed instructions and/or data from the new push buffer 410. Thus, the GPU may continue operation from the new push buffer 410. In this example, by allowing the GPU to operate using the new push buffer, the GPU may continue to process instructions and output data to hardware, such as a screen or monitor, without any visual ramifications resulting from the error.

If another error occurred during this process, any unprocessed data beginning from a hardware state storage object and after the other error may be saved. As an option, this process may be repeated multiple times until all errors are cleared or a threshold limiting a number of recoveries has been reached.

If a threshold limiting a number of recovery attempts has been reached, it may be determined that the errors are such that the instructions may not be executed. In this case, handling such errors may differ depending on the types of errors and/or the extent of the errors. It should be noted that all errors occurring; in the push buffer 402 and the new push buffer 410 may be recorded in a log file.

In one embodiment, a driver may monitor a number of errors which occur when reading the instructions from the push buffer 402. In such case, there may be a threshold on the number of errors allowed, hi one embodiment, the threshold for the number of errors allowed may determine a mode of operation for a push buffer.

For example, if the number of errors exceeds the threshold, the new push buffer 410 may be set to a peripheral component interconnect (PCI) mode. Alternatively, if the number of errors is below the threshold, the new push buffer 410 may be set to an accelerated graphics port (AGP) mode. As an option, the threshold may be time dependent. For example, if the number of errors is below the threshold in a certain amount of time (e.g. 1 second), the new push butler 410 may be set to a specific mode.

In one embodiment, a user may receive an alert or error message when the number of errors exceeds the threshold. Additionally, the user may receive an alert notifying the user of any mode changes caused by the errors. Such alert and/or error message may appear on a display of the user, for example.

Figure 5:
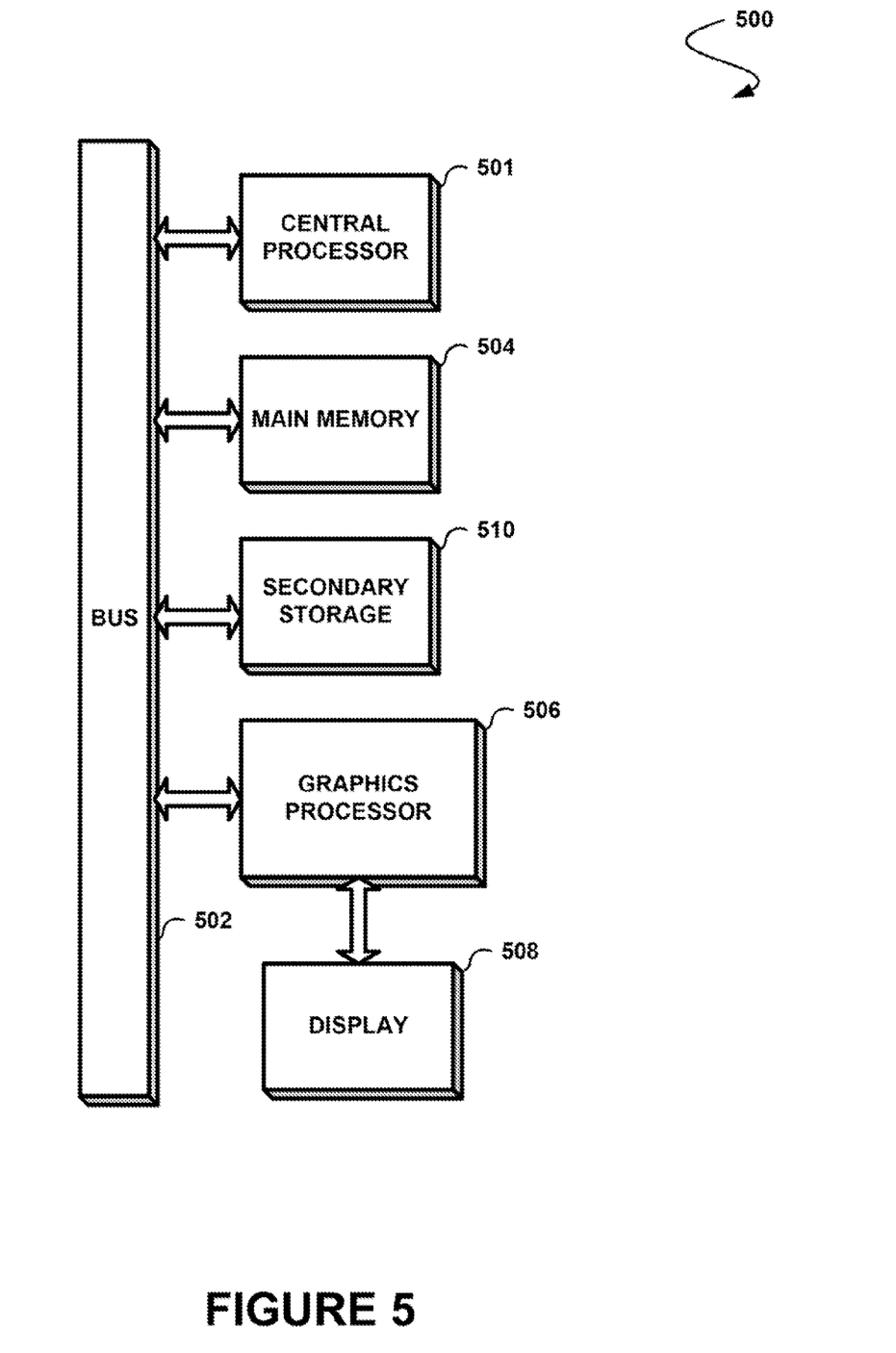
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including, at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to a personal digital assistant (PDA) device, a mobile phone device, a television, etc.

Further, not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined, only in accordance with the following claims and their equivalents.

What is claimed is:

1. A method, comprising:
controlling operation of hardware utilizing a push buffer;
detecting an error; and
in response to the error, saving, at least in part, an unprocessed portion of the push buffer;
wherein the controlling, the detecting, and the saving is performed by a driver.

2. The method of claim 1, wherein the hardware includes a graphics processor.

3. The method of claim 2, wherein the graphics processor includes a graphics processing unit (GPU).

4. The method of claim 1, wherein the unprocessed portion of the push buffer is used for controlling the hardware after the error.

5. The method of claim 1, wherein the unprocessed portion of the push buffer is used for restoring operation of the hardware.

6. The method of claim 5, wherein the operation of the hardware is restored by restoring a state of the hardware.

7. The method of claim 6, wherein the state of the hardware is restored utilizing a plurality of hardware state storage objects.

8. The method of claim 7, wherein the hardware state storage objects include markers.

9. The method of claim 7, wherein the hardware state storage objects include a fixed data structure.

10. The method of claim 7, wherein the hardware state storage objects are stored in the push buffer.

11. The method of claim 6, wherein the state of the hardware is restored utilizing at least one software state storage object.

12. The method of claim 5, wherein the operation of the hardware is restored by discarding a part of the unprocessed portion of the push buffer between an error point and a subsequent hardware state storage object.

13. The method of claim 5, wherein the operation of the hardware is restored by creating an additional push buffer.

14. The method of claim 13, wherein the additional push buffer is populated with the saved unprocessed portion of the push buffer.

15. The method of claim 5, wherein the operation of the hardware is restored without perceptible visual ramifications resulting from the error.

16. The method of claim 1, wherein the error results from at least one of a driver and the hardware.

17. A computer program product embodied on a computer readable medium, comprising:
   computer code for controlling operation of hardware utilizing a push buffer;
   computer code for detecting an error; and
   computer code for saving, at least in part, an unprocessed portion of the push buffer, in response to the error;
   wherein the controlling, the detecting, and the saving is performed by a driver.

18. An apparatus, comprising:
   a driver for controlling operation of hardware utilizing a push buffer, and saving, at least in part, an unprocessed portion of the push buffer, in response to detection of an error.

19. The apparatus of claim 18, wherein the hardware remains in communication with memory via a bus.

20. A method, comprising:
   controlling operation of hardware utilizing a push buffer;
   detecting an error; and
   in response to the error, saving, at least in part, an unprocessed portion of the push buffer;
   wherein the unprocessed portion of the push buffer is used for restoring operation of the hardware;
   wherein the operation of the hardware is restored by discarding a part of the unprocessed portion of the push buffer between an error point and a subsequent hardware state storage object.

21. A method, comprising:
   controlling operation of hardware utilizing a push buffer;
   detecting an error; and
   in response to the error, saving, at least in part, an unprocessed portion of the push buffer;
   wherein the unprocessed portion of the push buffer is used for restoring operation of the hardware;
   wherein the operation of the hardware is restored by creating an additional push buffer.

22. A method, comprising:
   controlling operation of hardware utilizing a push buffer;
   detecting an error; and
   in response to the error, saving, at least in part, an unprocessed portion of the push buffer;
   wherein the unprocessed portion of the push buffer is used for restoring operation of the hardware;
   wherein the operation of the hardware is restored without perceptible visual ramifications resulting from the error.

23. A computer program product embodied on a computer readable medium, comprising:
   computer code for controlling operation of hardware utilizing a push buffer;
   computer code for detecting an error; and
   computer code for saving, at least in part, an unprocessed portion of the push buffer, in response to the error;
   wherein the computer program product is operable such that the unprocessed portion of the push buffer is used for restoring operation of the hardware;
   wherein the computer program product is operable such that the operation of the hardware is restored by discarding a part of the unprocessed portion of the push buffer between an error point and a subsequent hardware state storage object.

24. A computer program product embodied on a computer readable medium, comprising:
   computer code for controlling operation of hardware utilizing a push buffer;
   computer code for detecting an error; and
   computer code for saving, at least in part, an unprocessed portion of the push buffer, in response to the error;
   wherein the computer program product is operable such that the unprocessed portion of the push buffer is used for restoring operation of the hardware;
   wherein the computer program product is operable such that the operation of the hardware is restored by creating an additional push buffer.

25. A computer program product embodied on a computer readable medium, comprising:
   computer code for controlling operation of hardware utilizing a push buffer;
   computer code for detecting an error; and
   computer code for saving, at least in part, an unprocessed portion of the push buffer, in response to the error;
   wherein the computer program product is operable such that the unprocessed portion of the push buffer is used for restoring operation of the hardware;
   wherein the computer program product is operable such that the operation of the hardware is restored without perceptible visual ramifications resulting from the error.

* * * * *